(12) United States Patent
Chiu

(10) Patent No.: US 9,007,120 B2
(45) Date of Patent: Apr. 14, 2015

(54) CHARGE PUMP DEVICE

(75) Inventor: Hsiang-Yi Chiu, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 67 days.

(21) Appl. No.: 13/590,175

(22) Filed: Aug. 20, 2012

(65) Prior Publication Data

US 2013/0229226 A1    Sep. 5, 2013

(30) Foreign Application Priority Data

Mar. 5, 2012    (TW) .............................. 101107303 A

(51) Int. Cl.
*G05F 1/10* (2006.01)
*H02M 3/07* (2006.01)

(52) U.S. Cl.
CPC ....................................... *H02M 3/07* (2013.01)

(58) Field of Classification Search
USPC ....................... 327/530, 534–537; 363/59, 60
See application file for complete search history.

(56) References Cited

U.S. PATENT DOCUMENTS

| | | | |
|---|---|---|---|
| 6,570,368 B2 | 5/2003 | Demizu | |
| 6,977,828 B2 * | 12/2005 | Wada | ............... 363/60 |
| 7,656,221 B2 * | 2/2010 | Maejima | ....................... 327/534 |
| 2004/0213024 A1 | 10/2004 | Wada | |
| 2010/0165182 A1 * | 7/2010 | Yuan | ............................. 348/374 |

FOREIGN PATENT DOCUMENTS

| | | |
|---|---|---|
| JP | 2002237192 | 8/2002 |
| TW | 200610136 | 3/2006 |
| TW | 200631294 | 9/2006 |

* cited by examiner

*Primary Examiner* — Siben Chen
(74) *Attorney, Agent, or Firm* — Winston Hsu; Scott Margo

(57) ABSTRACT

A charge pump device includes a charge pump circuit, for generating an output voltage according to a driving signal, a comparing circuit, for generating a comparison result according to the output voltage and a reference voltage, a detecting circuit, for detecting a frequency range of a ripple of the output voltage according to the comparison result and generating a detection result, and a driving stage, for generating the driving signal according to the comparison result, and adjusting a driving capability corresponding to the driving signal according to the detection result.

27 Claims, 12 Drawing Sheets

CHARGE PUMP DEVICE

BACKGROUND OF THE INVENTION

1. Field of the Invention

The present invention relates to a charge pump device and driving capability adjustment method thereof, and more particularly, to a charge pump device and driving capability adjustment method thereof capable of adjusting an output driving capability according to loading status while balancing both output ripple and loading affording capability.

2. Description of the Prior Art

Generally speaking, a charge pump device can be utilized for providing a stable output voltage to different loadings. In the prior art, the charge pump device is controlled by an operational amplifier or by a comparator. Under the structure utilizing the operational amplifier for performing controlling, the output voltage has smaller output ripples but may be unstable under different loadings and different external components. Although the output voltage is stable under the structure utilizing the comparator for controlling, the output voltage has greater periodic output ripples and may have noise in audio frequency band under certain loadings.

For example, please refer to FIG. 1A, which is a schematic diagram of a conventional charge pump device 10. The charge pump device 10 is realized in the structure utilizing the operational amplifier for performing controlling, and comprises a charge pump circuit 102, an operation amplifier 104, an adjusting transistor 106 and a driving stage 108. In brief, the charge pump circuit 102 generates an output voltage VGH according to a driving signal DRVP generated by the driving stage 108. For example, the charge pump circuit 102 may be a Dickson charge pump which controls an input voltage AVDD to charge flying capacitors CF1 and CF2 when the driving signal DRVP is at a low logic level, such that the charges stored in the flying capacitor CF1 and CF2 are outputted to an output capacitor CS1 when the driving signal DRVP is at a high logic level for sharing charge of the flying capacitor CF1 and CF2, to pump the output voltage VGH to a desired voltage level.

As to generating the driving signal DRVP for performing controlling, the voltage dividing resistors R1 and R2 divide the output voltage VGH for generating a feedback voltage FBP to the operational amplifier 104. The operational amplifier 104 compares the feedback voltage FBP and a reference voltage VREF to provide an output signal OP_OUT to the adjusting transistor 106 for performing adjusting the driving capability. Specifically, the feedback voltage FBP becomes higher and the output signal OP_OUT is also pulled high when the output voltage VGH becomes higher, such that the conducting resistance of the adjusting transistor 106 becomes greater (i.e. the gate-source voltage of the adjusting transistor 106 becomes smaller); and the feedback voltage FBP becomes lower and the output signal OP_OUT is pulled low when the output voltage VGH becomes lower, such that the conducting resistance of the adjusting transistor 106 becomes smaller (i.e. the gate-source voltage of the adjusting transistor 106 becomes smaller). Next, the driving stage 108 generates the driving signal DRVP according to the adjusting transistor 106 and a clock signal CLK, for controlling the charge pump circuit 102 to generate the desired output voltage VGH.

In detail, please refer to FIG. 1B, which is a waveform diagram of related signals of charge pump device 10 shown in FIG. 1A. As shown in FIG. 1B, since the driving stage 108 continuously triggers the driving signal DRVP to a high logic level when the clock signal CLK is at a high logic level and the conducting resistance of the adjusting transistor 106 is adjusted according to the output voltage VGH, a smaller charging current of the charge pump circuit 102 generated to the output voltage VGH of the output capacitor CS1 is obtained. Since the ripples of the output voltage VGH are proportional to the charging current, the output voltage VGH therefore has smaller output ripples.

However, since the output of the charge pump device 10 has a pole equals 1/(2π×CS1×loading resistance), the pole varies due to different external loadings and different capacitances of output capacitor CS1, causing the charge pump 10 to be unstable under certain circumstances.

On the other hand, please refer to FIG. 2A, which is a schematic diagram of another conventional charge pump device 20. The charge pump device 20 is partially similar to the charge pump device 10, and thus the same symbols are used for components and signals with the similar functions. The charge pump device 20 is controlled by a comparator, and comprises a charge pump circuit 102, a comparing circuit 204, a driving stage 206 and voltage dividing resistors R1 and R2, wherein the comparing circuit 204 comprises a comparator 208, a flip-flop 210 and a NAND gate 212. The operations of the charge pump device 102 pumps the output voltage VGH to the desired level according to the driving signal DRVP generated the driving stage 206 can be referred to the above, and are not narrated herein for brevity.

As to generation of the driving signal DRVP for performing controlling, the voltage dividing resistors R1 and R2 divide the output voltage VGH for generating the feedback voltage FBP to the comparator 208. The comparator 208 compares the feedback voltage FBP and the reference voltage VREF for providing a comparing output signal COMP_OUT, and the flip-flop 210 samples the voltage level of the comparing output signal COMP_OUT at the rising edges of the clock signal CLK and provides a comparing sample signal COMP_SAM (i.e. different from the comparing output signal COMP_OUT which may vary due to noise or interference, the comparing sample signal COMP_SAM stays at the same level during a time period of the clock signal CLK). The NAND gate 212 generates a comparing result signal COMP_SIG to the driving stage 206, such that the driving stage 206 can accordingly generate the toggling signal DRVP for controlling the charge pump circuit 102 to generate the desired output voltage VGH.

In detail, please refer to FIG. 2B, which is a waveform diagram of related signals of the charge pump device 20 shown in FIG. 2A. As shown in FIG. 2B, when the output voltage VGH is lower than a target voltage (i.e. the feedback voltage FBP is smaller than the reference voltage VREF), the comparing sample signal COMP_SAM starts outputting a high logic level for a period starting at a rising edge of the clock signal CLK. When both the comparing sample signal COMP_SAM and the clock signal CLK are at the high logic level (i.e. the comparing result signal COMP_SIG is at the low logic level), the driving signal DRVP is at the high logic level for controlling the charge pump circuit 102 to continuously charge the output voltage VGH. Next, after the output voltage VGH becomes greater than the target voltage, the comparing sample signal COMP_SAM outputs a low logic level for a period starting at another rising edge of the clock signal CLK, to keep the driving signal DRVP at the low logic level for controlling the charge pump device 102 not to charge the output voltage VGH. The output voltage VGH of the output capacitor CS1 is gradually decreased in driving the external loading. The above operations proceed repeatedly until the output voltage VGH is lower than the target voltage. In such a condition, since the charge pump device 20 only compares the feedback voltage FBP and the reference voltage VREF, the output voltage VGH is stable under different loading and capacitor CS1 conditions.

On the other hand, in comparison with the charge pump device 10 triggering the driving signal DRVP to the high logic level when the clock signal CLK is at the high logic level, the charge pump device 20 triggers the driving signal DRVP to high logic level only when both the comparing sample signal COMP_SAM and the clock signal CLK are at the high logic level (the driving signal DRVP is selectively triggered), such that a larger charging current of the charge pump circuit 102 is obtained, leading to larger output ripples.

In detail, the level of the high logic level of the driving signal DRVP relates to the driving capability corresponding to the driving signal DRVP. In the structure of comparator, since the transistors of driving stage 206 are turned fully on, the level of the driving signal DRVP is higher when the driving signal is at the high logic level. On the contrary, in the structure of the operational amplifier, since the output signal OP_OUT of the operational amplifier 104 adjusts the driving capability of the driving stage 108 via adjusting the transistor 106, the level of the driving signal DRVP is lower when the driving signal DRVP is at the high logic level. The driving capability provided by the charge pump circuit 102 is determined by the number of times the driving signal DRVP is triggered to the high logic level and the amplitude of the driving signal DRVP. For different loadings, the comparator structure adjusts the number of times the driving signal DRVP is triggered to the high logic level, while the operational amplifier structure adjusts the amplitude of the driving signal DRVP when the driving signal DRVP is at the high logic level.

When the system is stable, the average charging current of the charge pump circuit 102 for charging the output voltage VGH must equal the loading current, such that the output voltage VGH can be kept at the target level. For the same the loading current, since the driving signal DRVP in the operational amplifier structure keeps toggling while the one in the comparator structure toggles periodically, the charging current of the charge pump circuit 102 in the comparator structure is larger than that in the operational amplifier structure. Furthermore, the output ripples are proportional to the charging current, so the output voltage VGH of the comparator structure therefore has greater periodic output ripples. Thus, the comparator structure may generate audio noise which can be heard by human ear (20 Hz-20 kHz) under certain external loadings.

For example, please refer to FIG. 3, which is a waveform diagram of the driving signal DRVP shown in FIG. 2 generates audio noise under certain loadings. As shown in FIG. 3, when the driving signal DRVP continually toggles (i.e. a burst) for increasing the output voltage VGH to the target voltage, although the frequency of the driving signal continuously triggering (i.e. the frequency of the clock signal CLK) is higher than 20 kHz, the interval between two times of the driving signal DRVP continually triggering (i.e. the ripple frequency of the output voltage VGH) may be within 20 Hz-20 kHz, such that the audio noise is generated.

Therefore, although the charge pump device 20 controlled by the comparator does not cause problem of stability, the charge pump device 20 has greater output ripple which results in the audio noise under certain external loadings.

SUMMARY OF THE INVENTION

A charge pump device is disclosed, capable of avoiding audio noise and enhancing stability.

In an aspect, the present disclosure discloses a charge pump device. The charge pump device includes a charge pump circuit, for generating an output voltage according to a driving signal; a comparing circuit, for generating a comparison result according to the output voltage and a reference voltage; a detecting circuit, for detecting a frequency range of a ripple of the output voltage according to the comparison result and generating a detection result; and a driving stage, for generating the driving signal according to the comparison result, and adjusting a driving capability corresponding to the driving signal according to the detection result.

These and other objectives of the present invention will no doubt become obvious to those of ordinary skill in the art after reading the following detailed description of the preferred embodiment that is illustrated in the various figures and drawings.

DETAILED DESCRIPTION

Figure 4A:
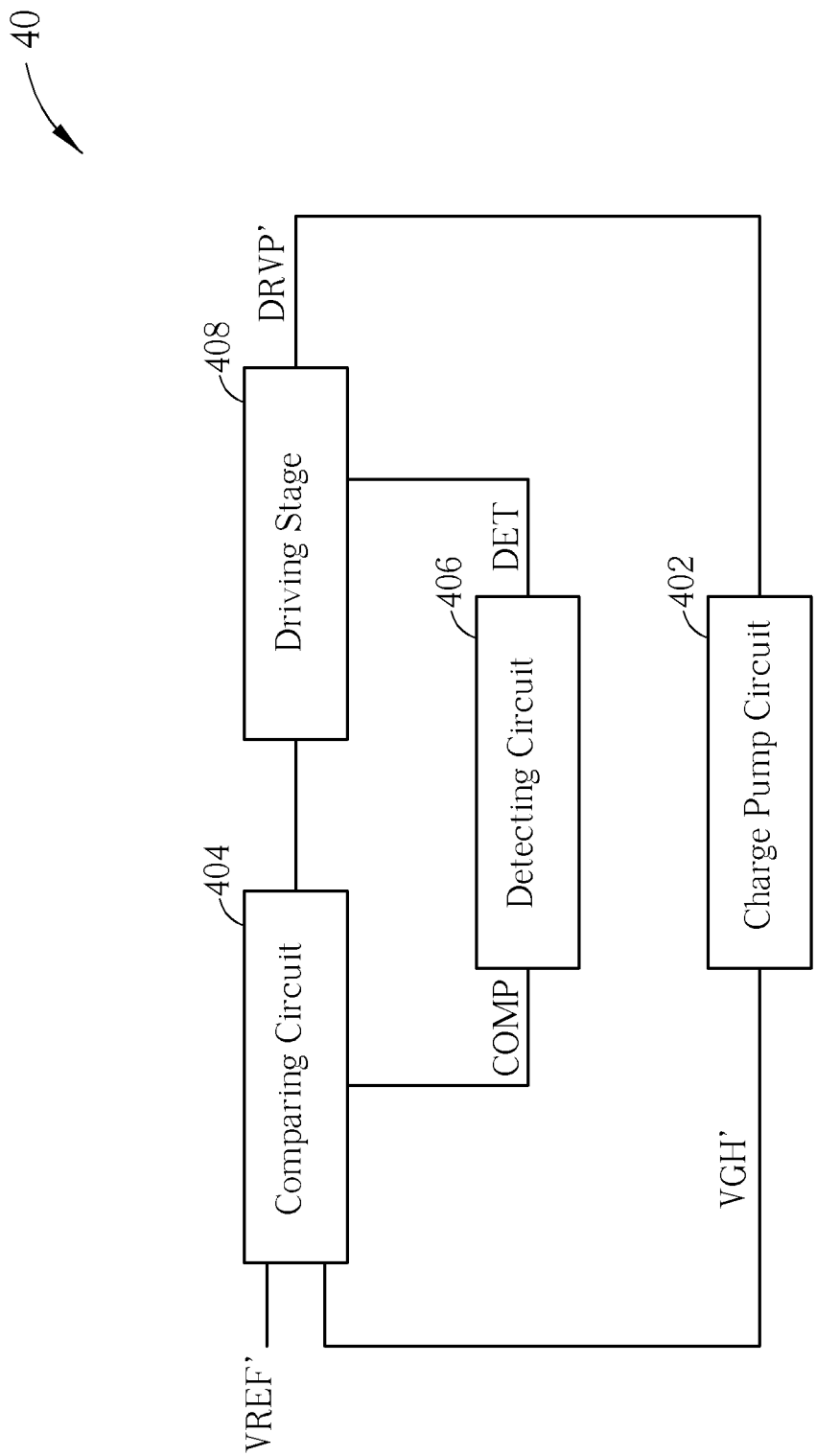
FIG. 4A is a schematic diagram of a charge pump device according to an embodiment.

Please refer to FIG. 4A, which is a schematic diagram of a charge pump device 40 according an embodiment. The charge pump device 40 is partially similar to the charge pump device 20. Thus, the components and the signals with similar functions are denoted by the same symbols. As shown in FIG. 4A, the charge pump device 40 comprises a charge pump circuit 402, a comparing circuit 404, a detecting circuit 406 and a driving stage 408. Simply speaking, the charge pump circuit 402 generates an output voltage VGH' either directly or indirectly according to a driving signal DRVP'. The comparing circuit 404 generates a comparison result COMP either directly or indirectly according to the output voltage VGH' and a reference voltage VREF'. The detecting circuit 406 detects a frequency range of the ripple of the output voltage VGH', and generates a detection result DET. The driving stage 408 generates the driving signal DRVP' and adjusts a driving capability corresponding to the driving signal DRVP' either directly or indirectly according to the detection result DET. As a result, the charge pump device 40 can control frequency of the ripple of the output voltage VGH' via adjusting the capability of the driving stage 408, to avoid audio noise.

In detail, the detection result DET can indicate whether the frequency of the ripple of the output voltage VGH' is within an audio frequency range. The detecting circuit 406 may determine the ripple frequency of the output voltage VGH' via measuring a pulse interval of the comparison result COMP (i.e. determining the ripple frequency of the output voltage VGH' via measuring the time of the output voltage VGH' greater than the target voltage). In an embodiment, when the detection result DET indicates the ripple frequency of the output voltage VGH' is outside an audio frequency range, the driving stage 408 maintains the driving capability corresponding to the current driving signal DRVP'; and conversely, when the detection result DET indicates the ripple frequency of the output voltage VGH' is within the audio frequency range, the driving signal DRVP' decreases the driving capability thereof, such that the ripple frequency of the output voltage VGH' becomes higher than the audio frequency (i.e. when the driving capability of the driving signal DRVP' becomes lower, the output voltage VGH' is needed to be driven more frequently for maintaining the output voltage VGH' at the target voltage level).

Note that, in the charge pump device 40 according to the embodiment shown in FIG. 4A, the detecting circuit 406 is coupled to the comparing circuit 404 for receiving the comparison result COMP, and is coupled to the driving stage 408 for outputting the detection result DET, such that the driving stage 408 adjusts the driving capability corresponding to the driving signal DRVP' directly according to the detection result DET. However, in other embodiment shown in FIG. 4B, the charge pump device 40 may further comprise a control circuit 410 coupled between comparing circuit 404 and the driving stage 408 and coupled to the detecting circuit 406, for adjusting the driving capability corresponding to the driving signal DRVP' according to the comparison result COMP and the detection result DET. Similarly, in such a condition, the control circuit 410 determines whether to transmit the comparison result COMP to the driving stage 408 according to the detection result DET. Preferably, when the detection result indicates the ripple frequency of the output voltage VGH' is within an audio frequency range, the control circuit 410 may limit the number of pulses of the comparison result COMP transmitting to the driving stage 408, to decrease the number of pulses triggering the driving signal DRVP' to toggle to high voltage level and thus to decrease the driving capability corresponding to the driving signal DRVP', such that the ripple frequency of the output voltage VGH' becomes higher than the audio frequency range.

Figure 4B:
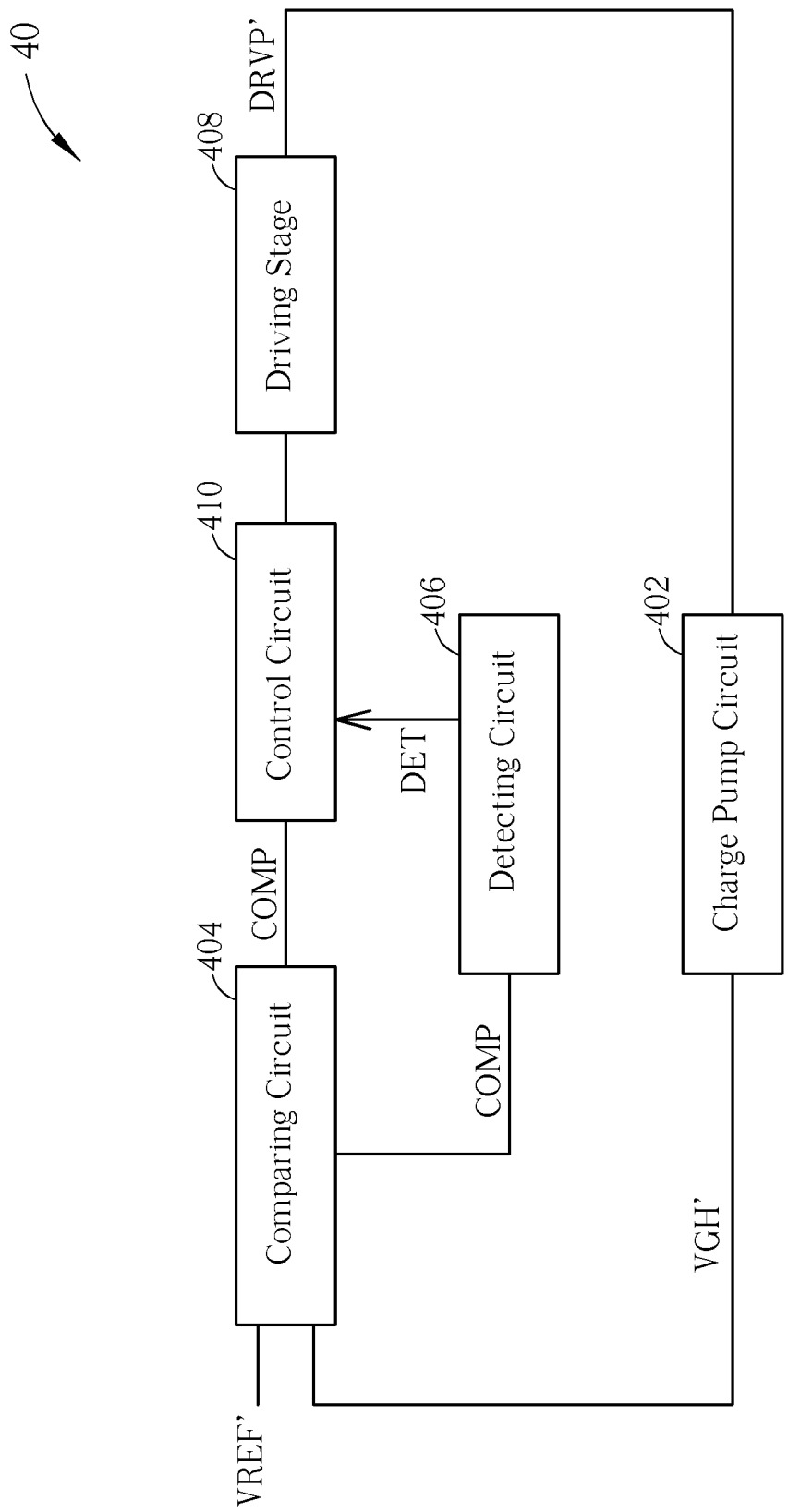
FIG. 4B is a schematic diagram of another charge pump device according to an embodiment.
Figure 5:
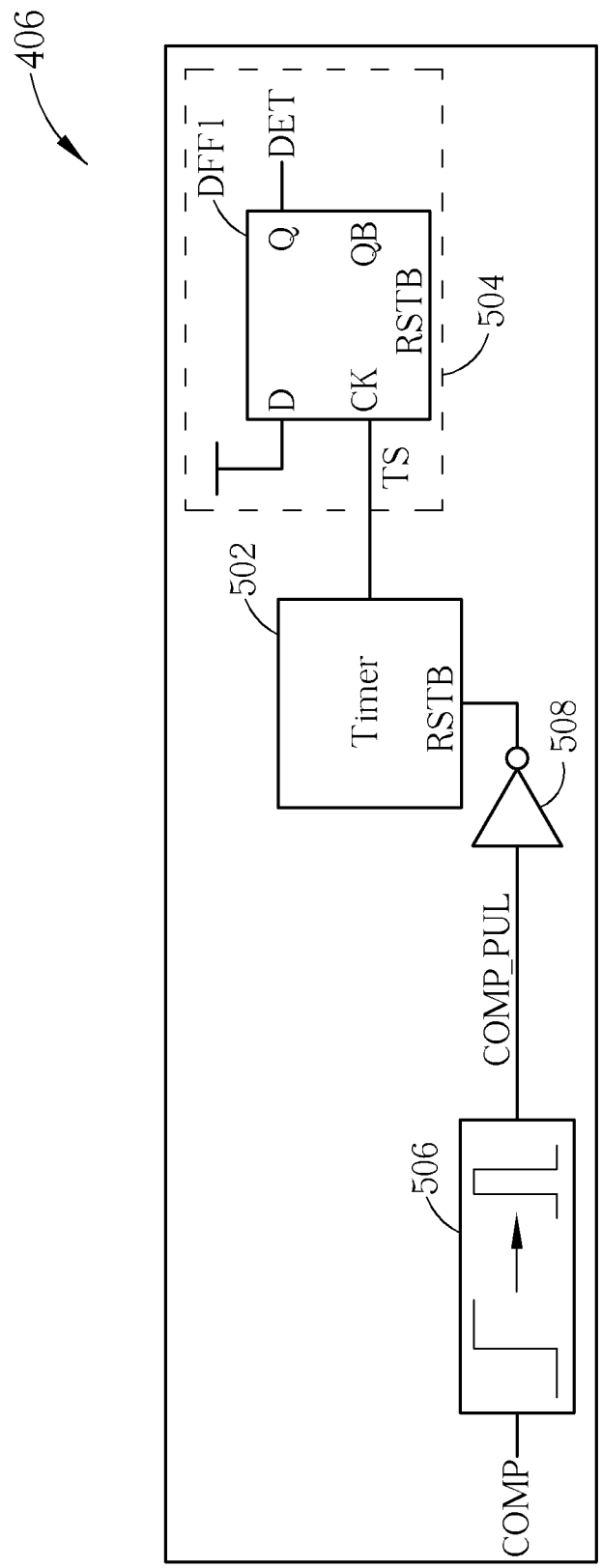
FIG. 5 is a schematic diagram of the detecting circuit shown in FIG. 4A or FIG. 4B according to an embodiment.

Specifically, please refer to FIG. 5, which is a schematic diagram of the detecting circuit 406 shown in FIG. 4A or FIG. 4B according to an embodiment. As shown in FIG. 5, the detecting circuit 406 comprises a timer 502 and an edge detecting unit 504. The timer 502 is coupled to the comparing circuit 404 for measuring the time of a pulse interval of the signal corresponding to the comparison result COMP, to generate a clock signal TS indicating whether the pulses interval reaches a specific time. The edge detecting unit 504 is coupled to the timer 502 for detecting edges of the clock signal TS, to generate a detection signal as the detection result DET. The edge detecting unit 504 may comprise a flip-flop DFF1 which comprises a clock terminal CK coupled to the clock signal TS, and an output terminal Q for providing the detection result DET. The detecting circuit 406 may further comprise a pulse converting device 506 and an inverter 508. The pulse converting device 506 is coupled between the comparing circuit 404 and the timer 502, for generating a comparison pulse signal COMP_PUL to the timer 502 via the inverter 508 as a signal corresponding to the comparison result COMP according to the comparison result COMP.

In such a configuration, when the pulse converting device 506 detects a specific edge (i.e. a rising edge) of the comparison result COMP (e.g. a transition from low logic level to high logic level, i.e. the output voltage VGH' becomes lower than the target voltage), the comparison pulse signal COMP_PUL is triggered to high logic level in a short period such that the timer 502 is reset and starts counting (the timer 502 is reset when a reset terminal RSTB of the timer 502 is in low logic level). If the timer 502 has counted a specific time (e.g. 50 μs, i.e. the frequency is within the audio frequency range 20 kHz) and has not been reset (i.e. the comparison result is not switched from low logic level to high voltage level), the clock signal TS is triggered to high logic level, such that the detection signal DET is switched to high logic level. As a result, the detecting circuit 406 can generate the detection signal DET via detecting the pulse intervals of the comparison result COMP, to indicate whether the ripple frequency of the output voltage VGH' is within the audio frequency range.

Figure 6:
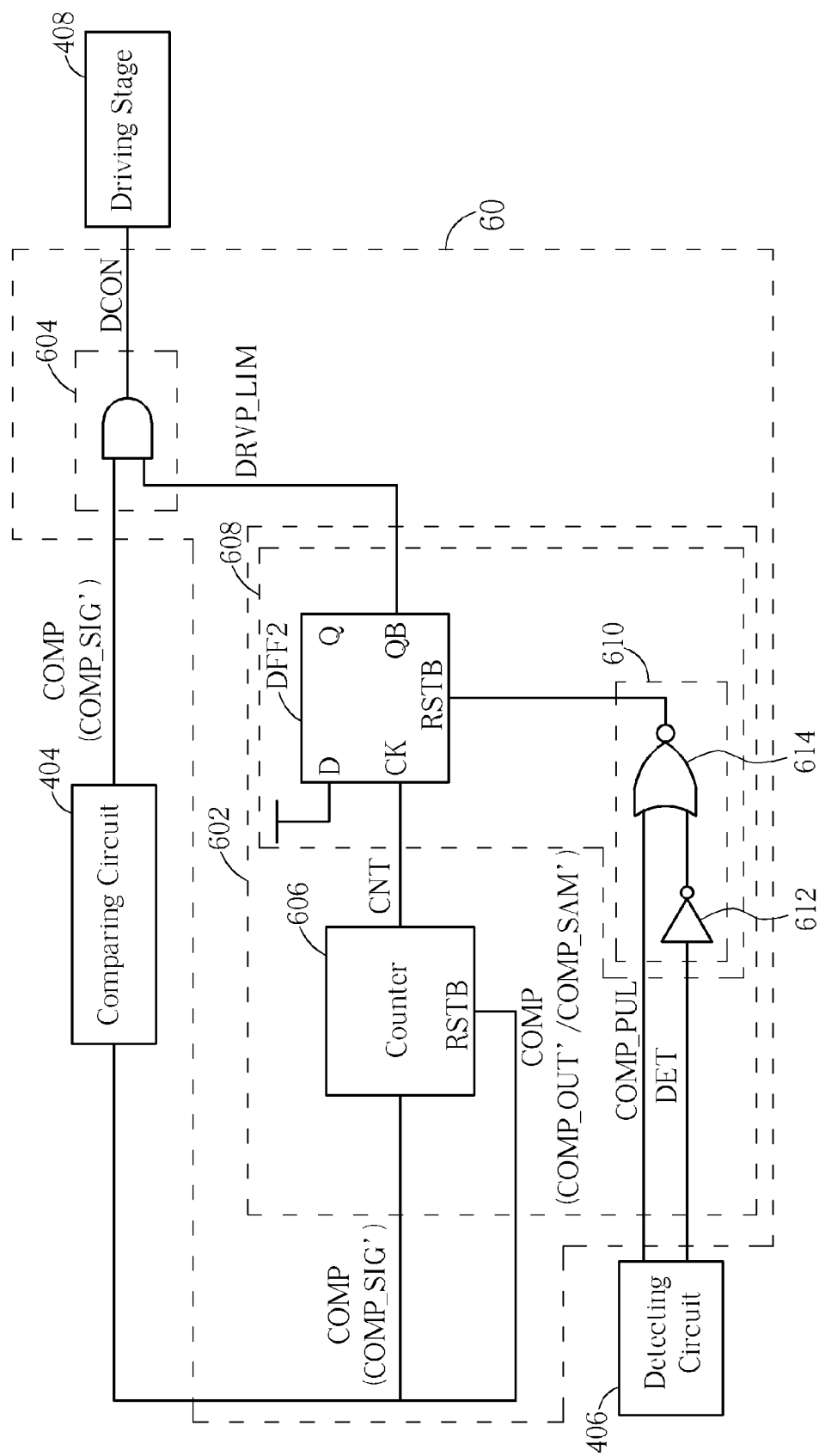
FIG. 6 is a schematic diagram of a control circuit shown in FIG. 4B according to an embodiment.

On the other hand, please refer to FIG. 6, which is a schematic diagram of a control circuit 60 shown in FIG. 4B according to an embodiment. As shown in FIG. 6, the control circuit 60 comprises a transmitting control unit 602 and a transmitting unit 604. The transmitting control unit 602 is coupled between the comparing circuit 404 and the detecting circuit 406, for generating a transmitting control signal DRVP_LIM according to the detection result DET and the comparison result COMP. The transmitting unit 604 is coupled between the comparing circuit 404 and the driving stage 408, for determining whether to output the comparison result COMP to the driving stage 408 as a driving control signal DCON.

In such a condition, when the detection result DET indicates the ripple frequency of the output voltage VGH' is higher than the audio frequency range, the transmitting control signal DRVP_LIM controls the transmitting unit 604 to output the comparison result COMP to the driving stage 408, such that the driving stage 408 triggers the driving signal DRVP' to toggle to high voltage level according to all the pulses of the comparison result COMP. Otherwise, when the detection result DET indicates the ripple frequency of the output voltage VGH' is within the audio frequency range, the transmitting control unit 602 counts the number of the pulses of each pulses string and generates the transmitting control signal DRVP_LIM, for controlling the transmitting unit 604 to stop outputting the comparison result COMP to the driving stage 608 when the number of pulse reaches a specific number, such that the driving stage 408 triggers the driving signal DRVP' to toggle to high voltage level according to part of pulses of the comparison result COMP only. As a result, the driving capability of the driving signal DRVP' is decreased, such that the ripple frequency of the output voltage VGH' becomes higher than the audio frequency range.

In a specific embodiment, the transmitting control unit 602 comprises a counter 606 and an edge detecting unit 608. The counter 606 is coupled to the comparing circuit 404 for counting the number of pulses of each pulse string in the comparison result COMP (such as counting the comparison result signal COMP_SIG'), to generate a count signal CNT. The edge detecting unit 608 is coupled to the counter 606 and the detecting circuit 406, for generating the transmitting control signal DRVP_LIM according to the detection result DET and a specific edge of the count signal CNT. In detail, when the detection result DET indicates the ripple frequency of the output voltage VGH' is within the audio frequency range and the counter 606 counts the number of the pulses of each pulse string corresponding to the comparison result COMP to the specific number, the counter 606 generates the count signal CNT with the specific edge, such that the edge detecting unit 608 generates the transmitting control signal DRVP_LIM to control the transmitting unit 604 to stop outputting the comparison result COMP (such as the comparison result signal COMP_SIG') to the driving stage 408.

In a specific embodiment, the edge detecting unit 608 may comprise a flip-flop DFF2 and a reset signal generating unit 610. The flip-flop DFF2 comprises a clock terminal CK coupled to the count signal CNT, an output terminal QB for providing the transmitting control signal DRVP_LIM, and a reset terminal RSTB coupled to the detecting circuit 406. The reset signal generating unit 610 is coupled between the reset terminal RSTB and the detecting circuit 406, for determining whether to reset the flip-flop DFF2 according to the detection result DET and the comparison pulse signal COMP_PUL corresponding to the comparison result COMP. For example, the reset signal generating unit 610 may comprises an inverter 612 and a NOR gate 614. The inverter 612 comprises an input terminal coupled to the detecting circuit 406. The NOR gate 614 comprises two input terminals coupled to an output terminal of the inverter 612 and the comparison pulse signal COMP_PUL, respectively, and an output terminal coupled to the reset terminal RSTB of the flip-flop DFF2.

In such a condition, when the detection signal DET is switched to high logic level for indicating the ripple frequency of the output voltage VGH' is within the audio frequency range and the comparison pulse signal COMP_PUL is triggered to high logic level in a short period for indicating the comparison result COMP is switched from low logic level to high logic level (i.e. the output voltage VGH' is lower than the target voltage), the reset terminal RSTB of the flip-flop DFF2 receives a signal in low logic level for performing reset and the flip-flop DFF2 outputs the transmitting control signal DRVP_LIM in high logic level, such that the transmitting unit 604 outputs all the pulses of the pulse strings corresponding to the comparison result COMP. Next, since the reset terminal RSTB of the counter 606 can be reset when the comparison result COMP is switched to low logic level (e.g. the comparison output signal COMP_OUT' or the comparison sample signal COMP_SAM' is switched to low logic level, i.e. the output voltage VGH' reaches the target voltage), the counter 606 can count the number of the pulses of each pulse string corresponding to the comparison result COMP, to trigger the clock terminal CK of the flip-flop DFF2 via the count signal CNT when the number of the pulses reaches the specific number, so as to switch the transmitting control signal DRVP_LIM to low logic level. Accordingly, the transmitting unit 604 does not output the following pulses of the pulse string corresponding to the comparison result COMP after the transmitting control signal DRVP_LIM is switched to low logic level. The driving capability of the driving signal DRVP' is therefore decreased, such that the ripple frequency of the output voltage VGH' becomes higher than the audio frequency range.

Noticeably, the main spirit of the above embodiments is the charge pump device 40 can detect the comparison result COMP for determining whether the ripple frequency of the output voltage VGH' is within an audio frequency range, and then decide whether to adjust the driving capability of the driving stage 408 for ensuring the output voltage VGH' has no audio noise in an audio frequency range. Those skilled in the art may accordingly observe appropriate modifications and alternations, and are not limited herein.

Figure 1A:
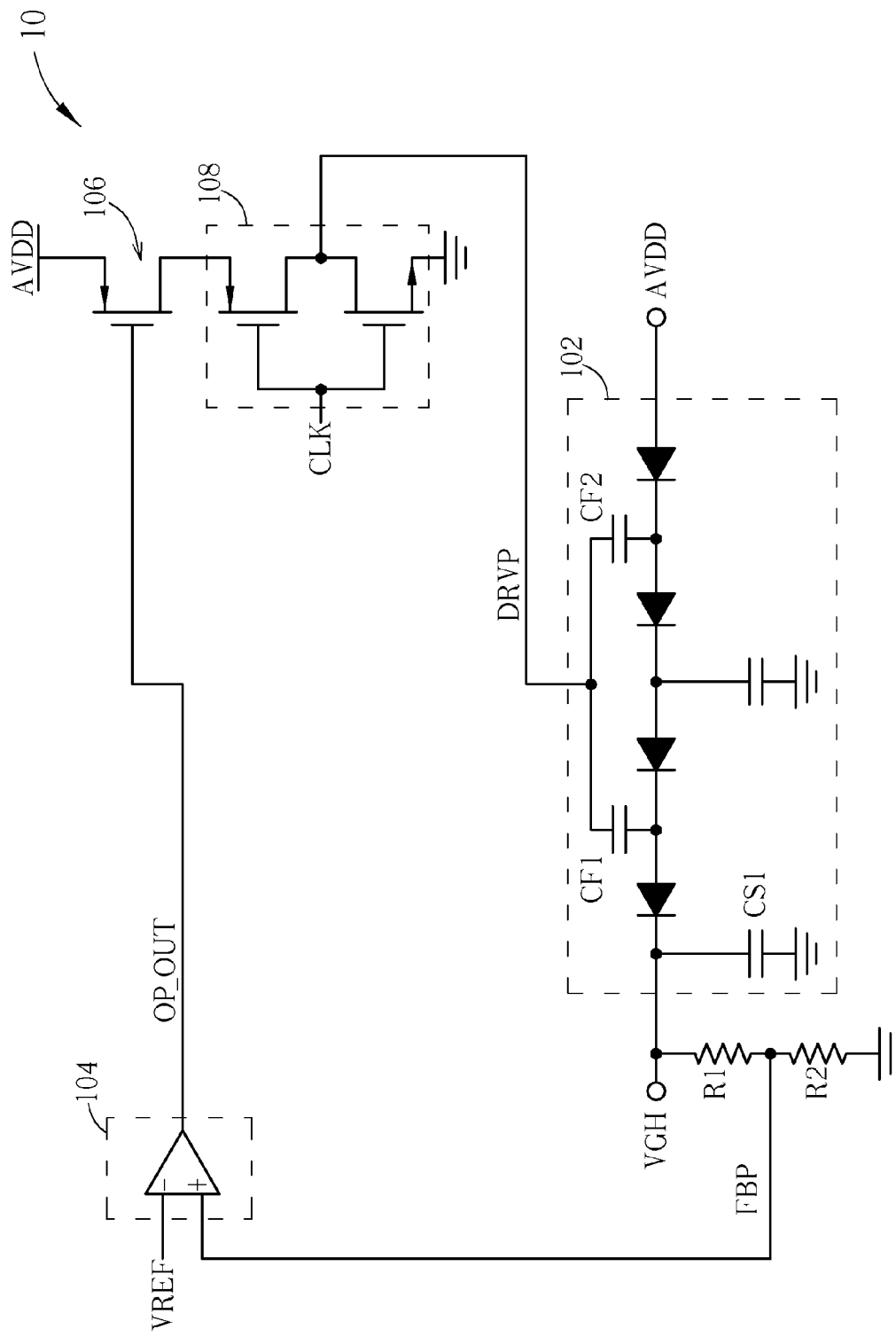
FIG. 1A is a schematic diagram of a conventional charge pump device.
Figure 1B:
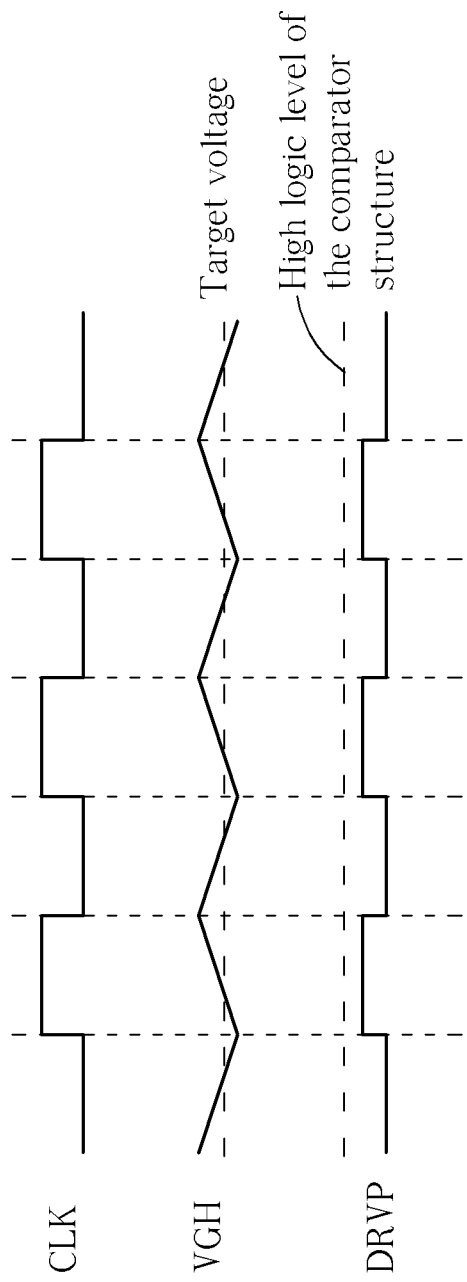
FIG. 1B is a schematic diagram of related signals of the charge pump device shown in FIG. 1A.
Figure 2A:
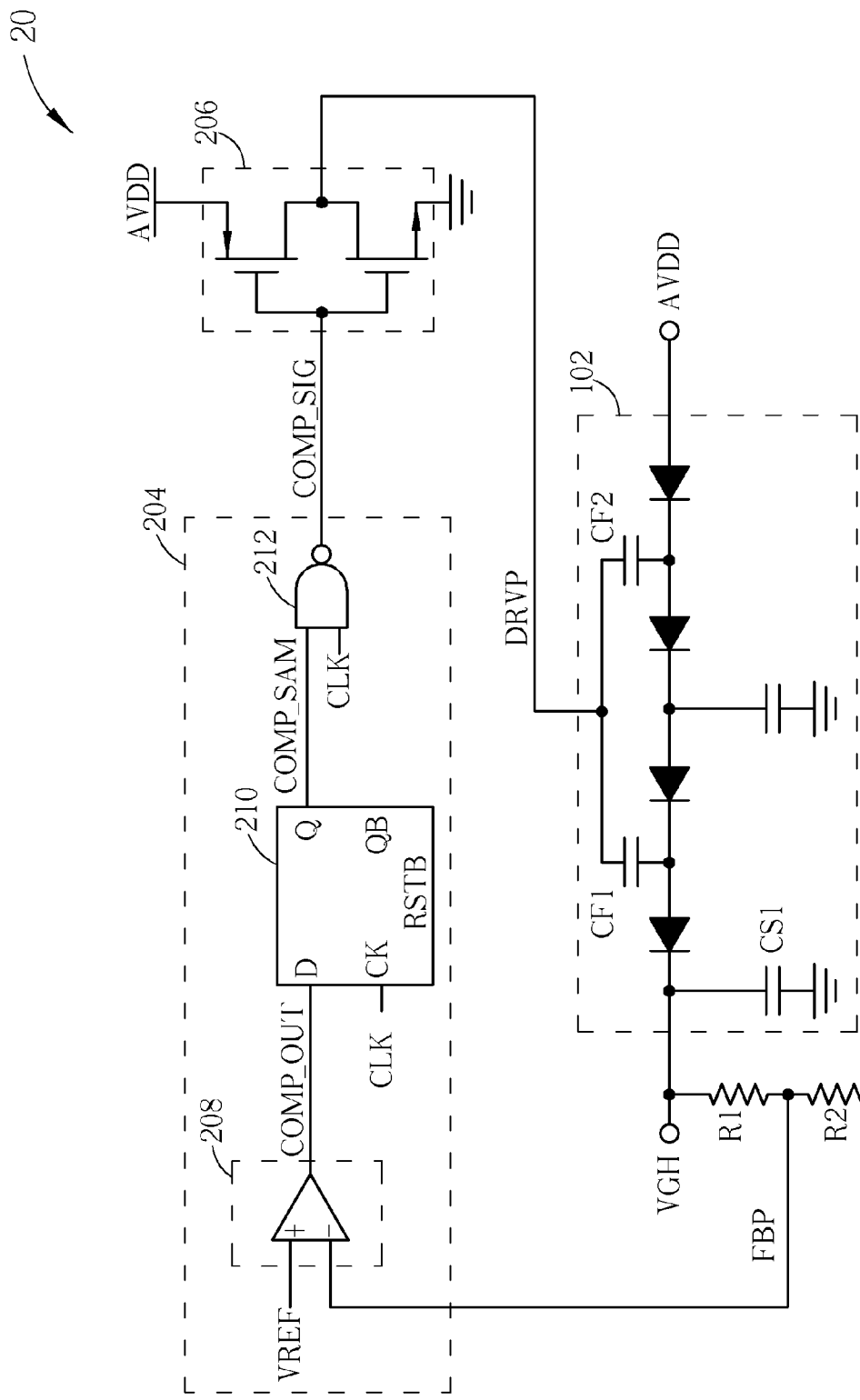
FIG. 2A is a schematic diagram of another conventional charge pump device.
Figure 2B:
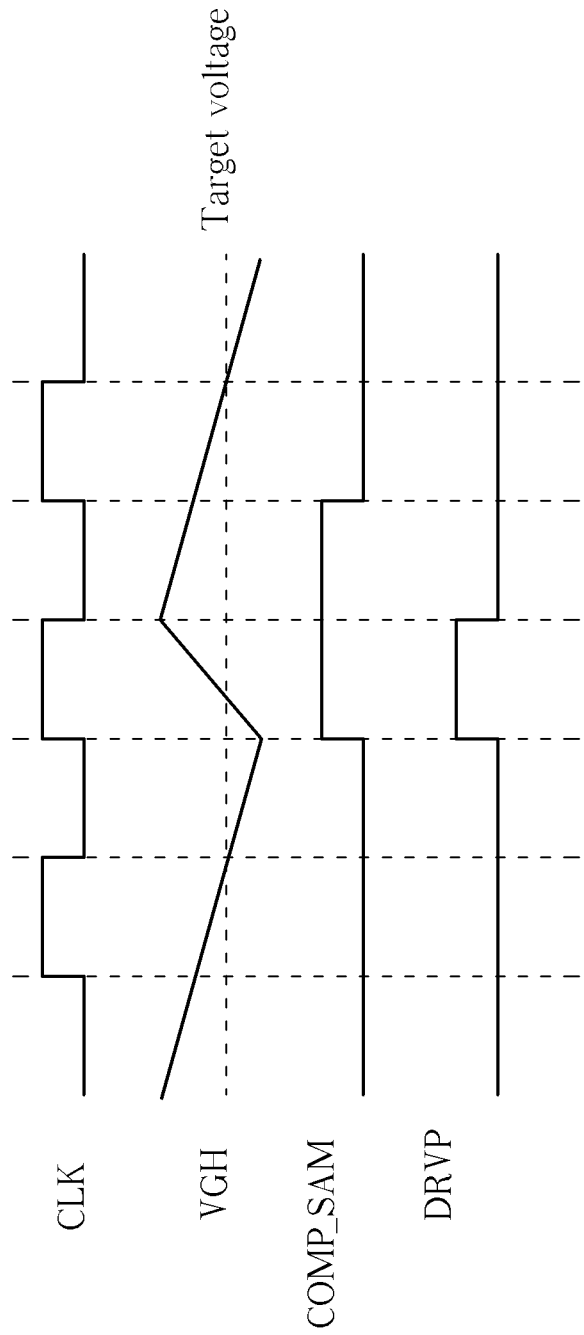
FIG. 2B is a schematic diagram of related signals of the charge pump device shown in FIG. 2A.
Figure 3:
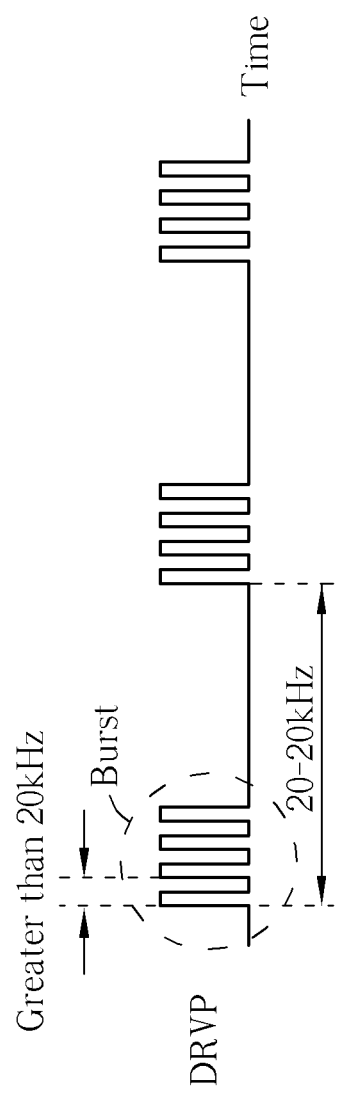
FIG. 3 is a schematic diagram of a driving signal shown in FIG. 2 generates audio noise under certain loadings.
Figure 7:
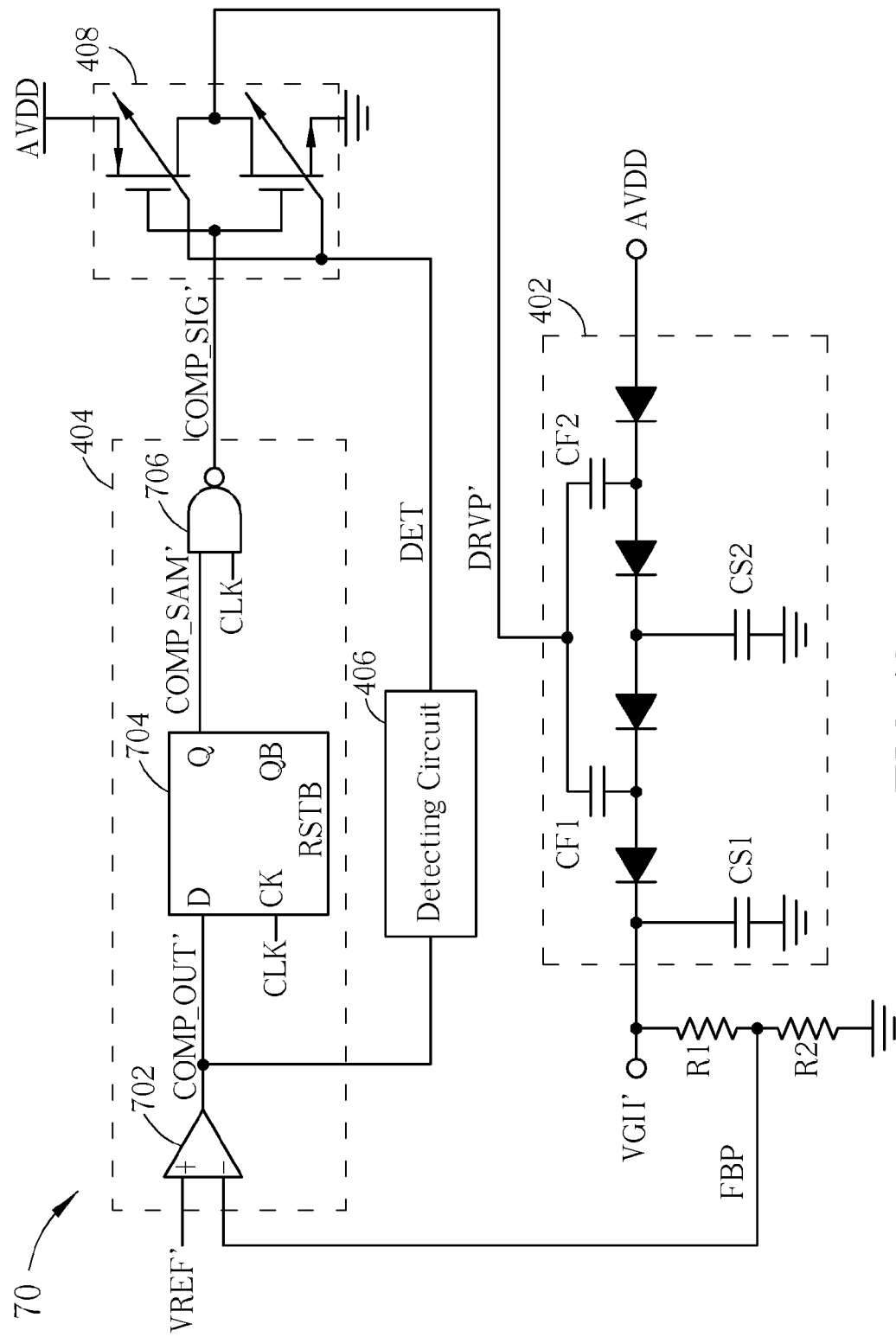
FIG. 7 is a schematic diagram of a charge pump device for realizing the charge pump device 40 shown in FIG. 4A according to an embodiment.

Please refer to FIG. 7, which is a schematic diagram of a charge pump device 70 for realizing the charge pump device 40 shown in FIG. 4A according to an embodiment. The charge pump circuit 402 shown in FIG. 7 is similar to the charge pump circuit 102 shown in FIG. 2A, and thus the components and the signals with similar functions are represented in the same symbols. As shown in FIG. 7, the comparing circuit 404 comprises a comparator 702, a flip-flop 704 and a NAND gate 706. The comparator 702 comprises two input terminals coupled to the output voltage VGH' and the reference voltage VREF', respectively, and an output terminal for providing a comparison output signal COMP_OUT'. The flip-flop 704 comprises a data input terminal D coupled to the output terminal of the comparator 702, a clock terminal CK for receiving a clock signal CLK, and a data output terminal Q for providing a comparison sample signal COMP_SAM' (i.e. the flip-flop 704 may output the voltage level of the comparison output signal COMP_OUT' at the rising edges of the clock signal CLK, and the comparison sample signal COMP_SAM' maintains at the same voltage level in a period of the clock signal CLK, which is different from the comparison output signal COMP_OUT' may be interfered by external noise and varied the voltage level thereof). The NAND gate 706 comprises two input terminals coupled to the data output terminal Q and the clock signal CLK, respectively, and an output terminal for providing a comparison result signal COMP_SIG'.

Note that, the above comparison result COMP comprises at least one of the comparison output signal COMP_OUT', the comparison sample signal COMP_SAM' and the comparison result signal COMP_SIG'. In other words, although the detecting circuit 406 shown in FIG. 7 receives the comparison output signal COMP_OUT', the detecting circuit 406 may receive the comparison output signal COMP_OUT' or the comparison sample signal COMP_SAM' (better noise immunity) and outputs a detection signal representing the detection result DET to the driving stage 408 for performing control.

In addition, the comparison result signal COMP_SIG' received by the driving stage 408 shown in FIG. 7 is corresponding to comparison result COMP received by the driving stage 408 shown in FIG. 4A. On the other hand, the counter 606 shown in FIG. 6 may receive the comparison result signal COMP_SIG' as the comparison result COMP, and the reset terminal RSTB thereof may receive the comparison output signal COMP_OUT' or the comparison sample signal COMP_SAM' as the comparison result COMP. The transmitting unit 604 shown in FIG. 6 may receive the comparison result signal COMP_SIG' as the comparison result COMP.

Moreover, in FIG. 7, the driving stage 408 adjusts the driving capability corresponding to the driving signal DRVP' according to the detection signal representing the detection result DET via using transistors with different sizes to generate the driving signal DRVP'. In other embodiments, the driving stage 408 can adjust the driving capability corresponding to the driving signal DRVP' according to the detection signal representing the detection result DET via using different numbers of transistors coupled in parallel to generate the driving signal DRVP'. Or, the driving stage 408 may comprise a plurality of buffers, and at least one of the plurality of buffers is enabled or disabled according to the detection result DET for adjusting the driving capability corresponding to the driving signal DRVP'.

Figure 8A:
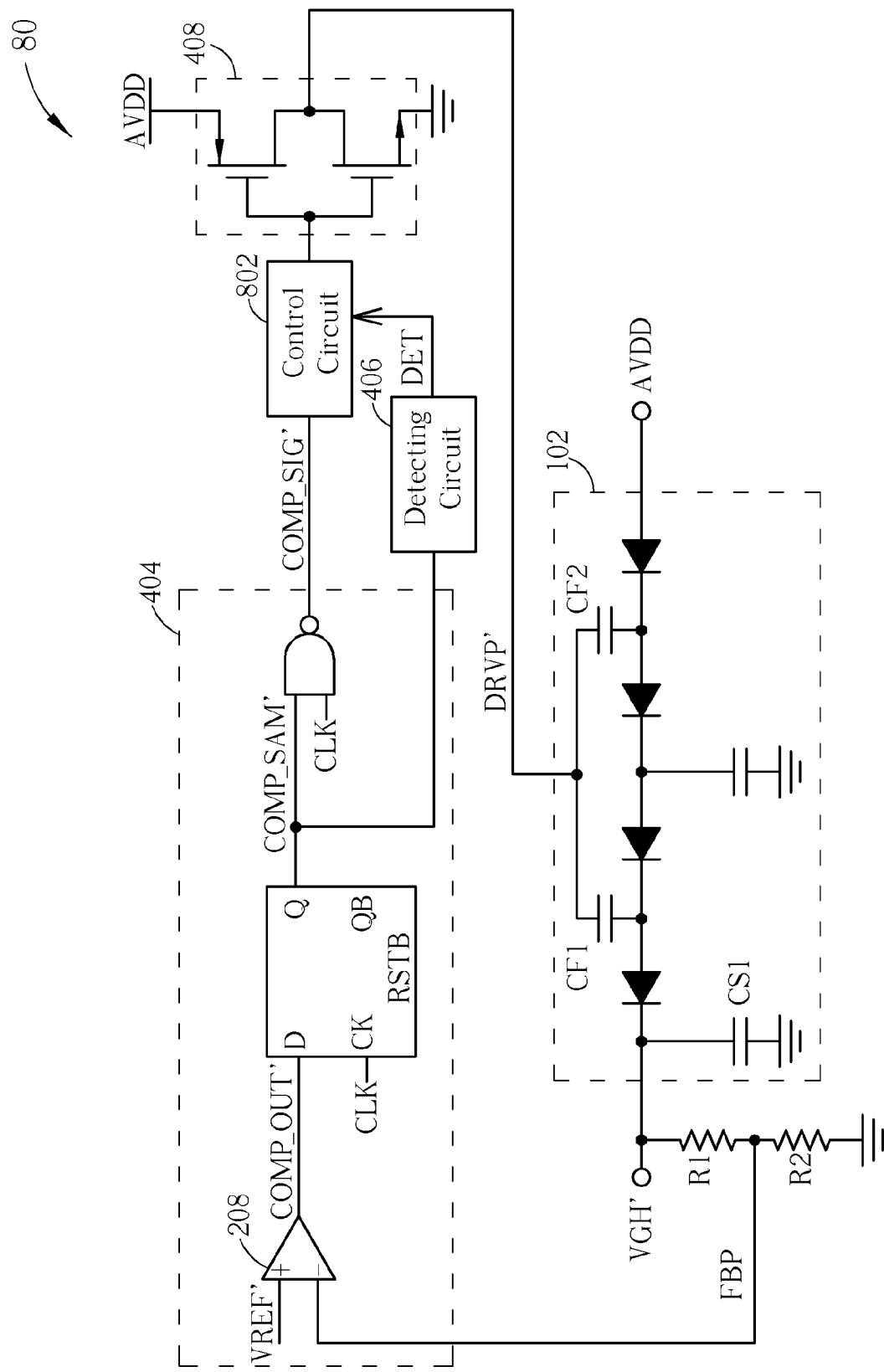
FIG. 8A is a schematic diagram of another charge pump device for realizing the charge pump device 40 shown in FIG. 4B according to an embodiment.

On the other hand, please refer to FIG. 8A, which is a schematic diagram of another charge pump device 80 for realizing the charge pump device 40 shown in FIG. 4B according to an embodiment. The charge pump device 80 is partly similar to the charge pump device 70, and thus the components and the signal with similar functions are represented in the same symbols. The differences between the charge pump device 80 and the charge pump device 70 is that the charge pump device 80 further comprises a control circuit 802 for receiving the comparison result signal COMP_SIG' and the detection signal DET, to output the driving control signal DCON to the driving stage 408 according to the comparison result signal COMP_SIG' and the detection signal DET. Another difference is that the detecting circuit 406 receives the comparison sample signal COMP_SAM' (or the comparison output signal COMP_OUT'). In such a condition, the driving stage 408 adjusts the driving capability corresponding to the driving signal DRVP' via changing the number of times the charge pump circuit 402 is contiguously charged.

Figure 8B:
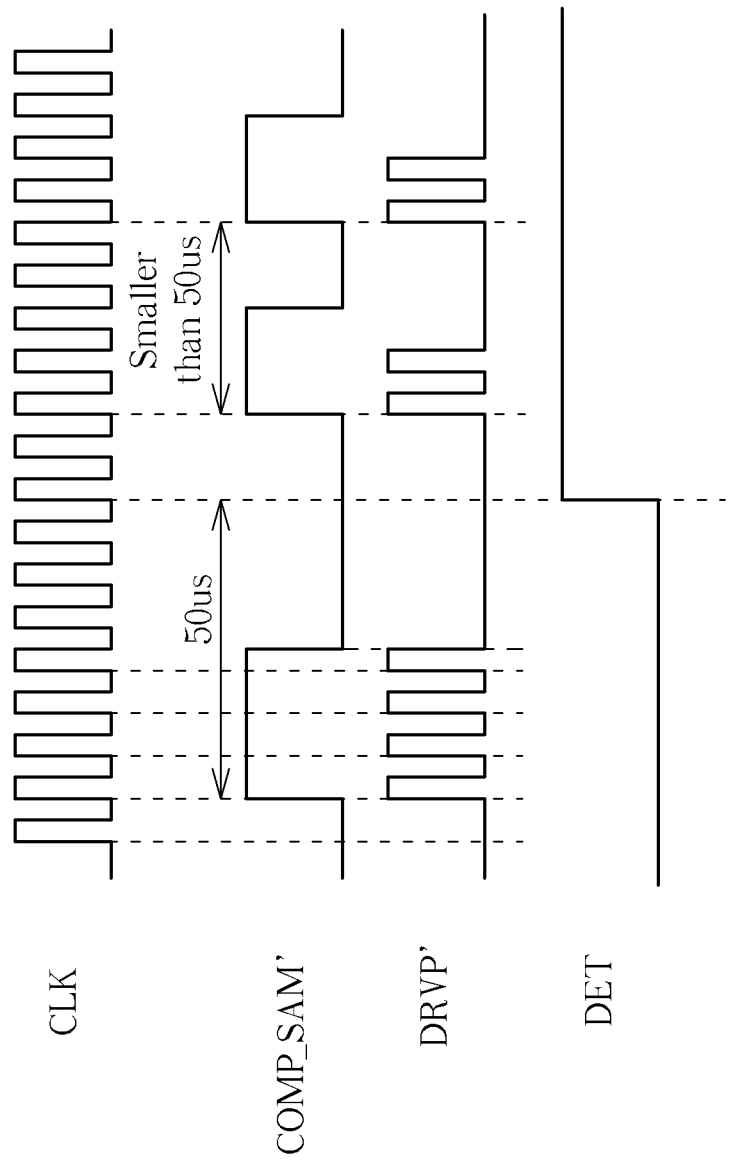
FIG. 8B is a schematic diagram of related signals of the charge pump device shown in FIG. 8A.

For example, please refer to FIG. 8B, which is a waveform diagram of related signals of the charge pump device 80 shown in FIG. 8A. As shown in FIG. 8B, the detection result DET is triggered to the high logic level when the detecting circuit 406 detects a pulse interval of the comparison sample signal COMP_SAM' is greater than a specific time (e.g. 50 μs, i.e. the frequency of the comparison sample signal is within the audio frequency range 20 kHz), such that the control circuit 802 outputs only part of the pulses of the comparison result signal COMP_SIG' to the driving stage 408. The number of pulses and the driving capability of the driving signal DRVP' are therefore decreased, causing the ripple frequency of the output voltage VGH' to be higher than the audio frequency range.

It is noted that the word "coupled" is defined as connected, either directly, or indirectly through intervening components which are not necessarily limited to physical connections. In addition, the term "signal" can mean at least one or more currents, voltages, charges, data, or other such identifiable quantities.

In the prior art, the structure controlled by the operational amplifiers has a pole at the output and the pole is changed under different external loadings and different output capacitors, thus causing concerns about stability. Although the charge pump controlled by the comparator has no problem of stability, the charge pump device controlled by the comparator has greater output ripple, which results in audio noise under certain external loadings. In comparison, the above embodiments determine whether the ripple frequency of the output voltage VGH' is within an audio frequency range, and then decide whether to adjust the driving capability of the driving stage 408 so as to make output ripple out of audible frequency. The output voltage VGH' therefore has no audio noise. Besides, the charge pump device controlled by the comparator can avoid stability problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charge pump device, comprising:
   a charge pump circuit, for generating an output voltage according to a driving signal;
   a comparing circuit, for generating a comparison result according to the output voltage and a reference voltage;
   a detecting circuit, for detecting a frequency range of a ripple of the output voltage according to the comparison result by measuring a pulse interval of the comparison result and generating a detection result;
   a driving stage, for generating the driving signal according to the comparison result, and adjusting a driving capability corresponding to the driving signal according to the detection result; and
   a control circuit, coupled between the comparing circuit and the driving stage, and coupled to the detecting circuit, for adjusting the driving capability corresponding to the driving signal according to the comparison result and the detection result.

2. The charge pump device of claim 1, wherein the detection result indicates whether a ripple frequency of the output voltage is within an audio frequency range.

3. The charge pump device of claim 2, wherein the driving signal decreases the driving capability corresponding to the driving signal when the detection result indicates the ripple frequency of the output voltage is within the audio frequency range, such that the ripple frequency of the output voltage becomes higher than the audio frequency range.

4. The charge pump device of claim 1, wherein the detecting circuit is coupled to the comparing circuit for receiving the comparison result, and is coupled to the driving stage for outputting the detection result to the driving stage.

5. The charge pump device of claim 1, wherein the control circuit determines whether to transmit the comparison result to the driving stage according to the detection result.

6. The charge pump device of claim 1, wherein the control circuit limits at least a part of pulses of the comparison result to be transmitted to the driving stage when the detection result indicates a ripple frequency of the output voltage is within an audio frequency range.

7. The charge pump device of claim 1, wherein the detecting circuit comprises:
   a timer, coupled to the comparing circuit for measuring a pulse interval of a signal corresponding to the comparison result, to generate a clock signal for indicating whether the pulse interval reach a specific time; and
   an edge detecting unit, coupled to the timer for detecting an edge of the clock signal, to generate a detection signal as the detection result.

8. The charge pump device of claim 7, wherein the edge detecting circuit comprises a first flip-flop having a clock terminal coupled to the clock signal and an output terminal for providing the detection signal.

9. The charge pump device of claim 7 further comprising a pulse converting device, coupled between the comparing circuit and the timer for generating a comparison pulse signal to the timer according to the comparison result.

10. The charge pump device of claim 1, wherein the control circuit comprises:
    a transmitting control unit, coupled between the comparing circuit and the detecting circuit for generating a transmitting control signal according to the detection result and the comparison result; and
    a transmitting unit, coupled between the comparing circuit and the driving stage, and coupled to the transmitting control unit, for determining whether to transmit the comparison result to the driving stage according to the detection result and the comparison result.

11. The charge pump device of claim 10, wherein the transmitting control signal controls the transmitting unit to output the comparison result to the driving stage when the detection result indicates the ripple frequency of the output voltage is higher than the audio frequency range.

12. The charge pump device of claim 10, wherein the transmitting control unit counts a number of pulses of each pulse string corresponding to the comparison result when the detection result indicates the ripple frequency of the output voltage is within the audio frequency range, and generates the transmitting control signal for controlling the transmitting unit to stop outputting the comparison result to the driving stage when the number of the pulses reaches a specific number.

13. The charge pump device of claim 10, wherein the transmitting control unit comprises:
a counter, coupled to the comparing circuit for counting a number of pulses of each pulse string corresponding to the comparison result, to generate a count signal; and
an edge detecting unit, coupled to the counter and the detecting circuit for detecting a specific edge of the count signal according to the detection result, to generate the transmitting control signal.

14. The charge pump device of claim 13, wherein the edge detecting circuit comprises a second flip-flop with a clock terminal coupled to the count signal, an output terminal for providing the transmitting control signal and a reset terminal coupled to the detecting circuit.

15. The charge pump device of claim 14, wherein the edge detecting circuit further comprises:
a reset signal generating unit, coupled between the reset terminal and the detecting circuit for determining whether to reset the second flip-flop according to a comparison pulse signal corresponding to the detection result and the comparison result.

16. The charge pump device of claim 15, wherein the reset signal generating unit comprises:
an inverter, comprising an input terminal coupled to the detecting circuit and an output terminal; and
a NOR gate, comprising two input terminals coupled to the output terminal of the inverter and the comparison pulse signal, respectively, and an output terminal coupled to the reset terminal of the second flip-flop.

17. The charge pump device of claim 1, wherein the comparing circuit comprises:
a comparator, comprising two input terminals coupled to the output voltage and the reference voltage, respectively, and an output terminal for providing a comparison output signal;
a third flip-flop, comprising a data input terminal coupled to the output terminal of the comparator, a clock terminal for receiving a clock signal, and a data output terminal for providing a comparison sample signal; and
a NAND gate, comprising two input terminals coupled to the data output terminal of the third flip flop and the clock signal, respectively, and an output terminal for providing a comparison result signal, wherein the comparison result comprises at least one of the comparison output signal, the comparison sample signal and the comparison result signal.

18. The charge pump device of claim 17, wherein the detecting circuit receives the comparison output signal or the comparison sample signal, and outputs a detection signal representing the detection result to the driving stage.

19. The charge pump device of claim 17, wherein
the detecting circuit receives the comparison output signal or the comparison sample signal and outputs a detection signal representing the detection result; and
the charge pump device further comprises a control circuit for receiving the comparison result signal and the detection signal, to output a driving control signal to the driving stage according to the comparison result signal and the detection signal.

20. The charge pump device of claim 1, wherein the driving stage adjusts the driving capability corresponding to the driving signal via changing a number of times continuously charging the charge pump circuit.

21. The charge pump device of claim 1, wherein the driving stage adjusts the driving capability corresponding to the driving signal via utilizing transistors with different sizes to generate the driving signal.

22. The charge pump device of claim 1, wherein the driving stage adjusts the driving capability corresponding to the driving signal via utilizing different numbers of transistors connected in parallel to generate the driving signal.

23. The charge pump device of claim 1, wherein the driving stage comprises a plurality of buffers and at least one of the buffers is enabled or disabled according to the detection result.

24. A charge pump device, comprising:
a charge pump circuit, for generating an output voltage according to a driving signal;
a comparing circuit, for generating a comparison result according to the output voltage and a reference voltage;
a detecting circuit, for detecting a frequency range of a ripple of the output voltage according to the comparison result and generating a detection result;
a driving stage, for generating the driving signal according to the comparison result, and adjusting a driving capability corresponding to the driving signal according to the detection result; and
a control circuit coupled between the comparing circuit and the driving stage, and coupled to the detecting circuit, for adjusting the driving capability corresponding to the driving signal according to the comparison result and the detection result, and determining whether to transmit the comparison result to the driving stage according to the detection result.

25. The charge pump device of claim 24, wherein the detection result indicates whether a ripple frequency of the output voltage is within an audio frequency range.

26. A charge pump device, comprising:
a charge pump circuit, for generating an output voltage according to a driving signal;
a comparing circuit, for generating a comparison result according to the output voltage and a reference voltage;
a detecting circuit, for detecting a frequency range of a ripple of the output voltage according to the comparison result and generating a detection result; and
a driving stage, for generating the driving signal according to the comparison result, and adjusting a driving capability corresponding to the driving signal according to the detection result; and
a control circuit coupled between the comparing circuit and the driving stage, and coupled to the detecting circuit, for adjusting the driving capability corresponding to the driving signal according to the comparison result and the detection result, and determining whether to transmit the comparison result to the driving stage according to the detection result;
wherein the detection result indicates whether a ripple frequency of the output voltage is within a specific frequency range.

27. The charge pump device of claim 26, wherein the specific frequency range is an audio frequency range.

* * * * *